United States Patent [19]

Finnigan

[11] 4,057,181

[45] Nov. 8, 1977

[54] CONTAINER AND ITS MOUNTING ON A SAFETY HARNESS

[76] Inventor: Joseph C. Finnigan, 1204 Allendale Road, McLean, Va. 22101

[21] Appl. No.: 627,119

[22] Filed: Oct. 30, 1975

[51] Int. Cl.² .............................................. B60R 21/00
[52] U.S. Cl. ................................ 224/29 R; 224/5 P; 244/151 R; 280/477; 297/389
[58] Field of Search ............ 224/5 R, 5 P, 5 H, 5 L, 224/5 Q, 5 MC, 5 N, 5 BC, 8 R, 26 R, 26 D, 26 K, 26 C, 26 J, 27, 22, 29 R, 29 C, 29 D; 280/744, 747; 297/385, 389; 2/247, 249; 180/82 C; 244/122 B, 140, 141, 151 R

[56] References Cited

U.S. PATENT DOCUMENTS

| 524,104 | 8/1894 | Doherty | 224/26 C |
|---|---|---|---|
| 1,648,565 | 11/1927 | Primley | 224/26 C X |
| 2,120,234 | 6/1938 | Armstrong | 224/29 R X |
| 2,688,427 | 9/1954 | Simons | 224/5 H |
| 3,306,662 | 2/1967 | Finnigan | 297/389 |
| 3,370,236 | 2/1968 | Walker | 224/5 H X |
| 3,743,147 | 7/1973 | Wilczynski | 224/26 R |
| 3,856,328 | 12/1974 | Koizumi | 280/747 |
| 3,878,589 | 4/1975 | Schaefer | 224/26 R X |
| 3,912,328 | 10/1975 | Tanaka | 297/389 |
| 3,957,282 | 5/1976 | Finnigan | 280/744 |

FOREIGN PATENT DOCUMENTS

| 1,368,324 | 6/1964 | France | 297/385 |
|---|---|---|---|
| 1,905,502 | 8/1970 | Germany | 297/389 |
| 23,423 of | 1907 | United Kingdom | 224/22 |

Primary Examiner—Robert J. Spar
Assistant Examiner—Winston H. Douglas
Attorney, Agent, or Firm—Barlow & Barlow

[57] ABSTRACT

A container for coins, paper money, cards or other articles with means for mounting it on a body belt or safety harness worn in a vehicle, such as an automobile, and which is attachable and detachable from the safety harness.

8 Claims, 24 Drawing Figures

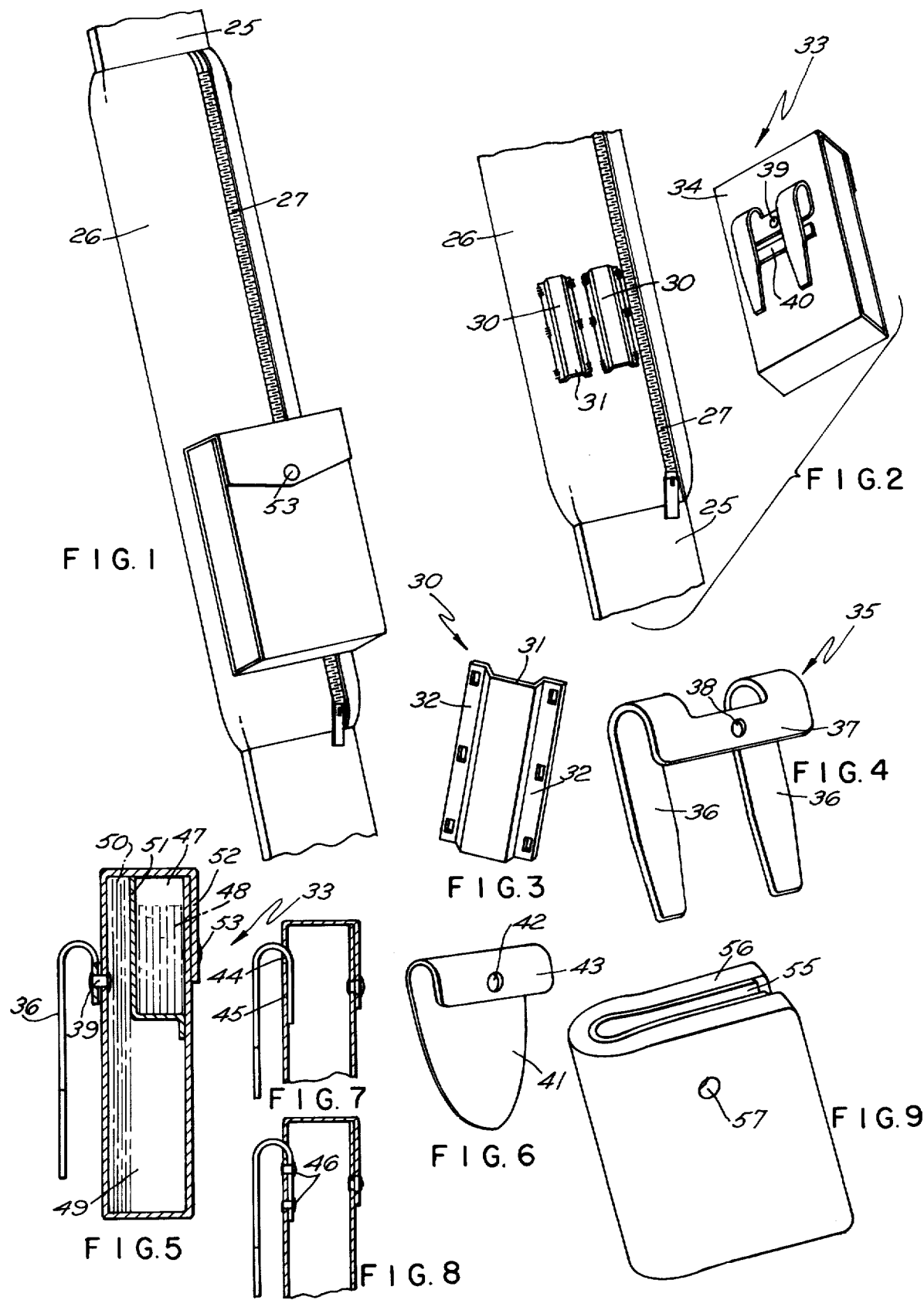

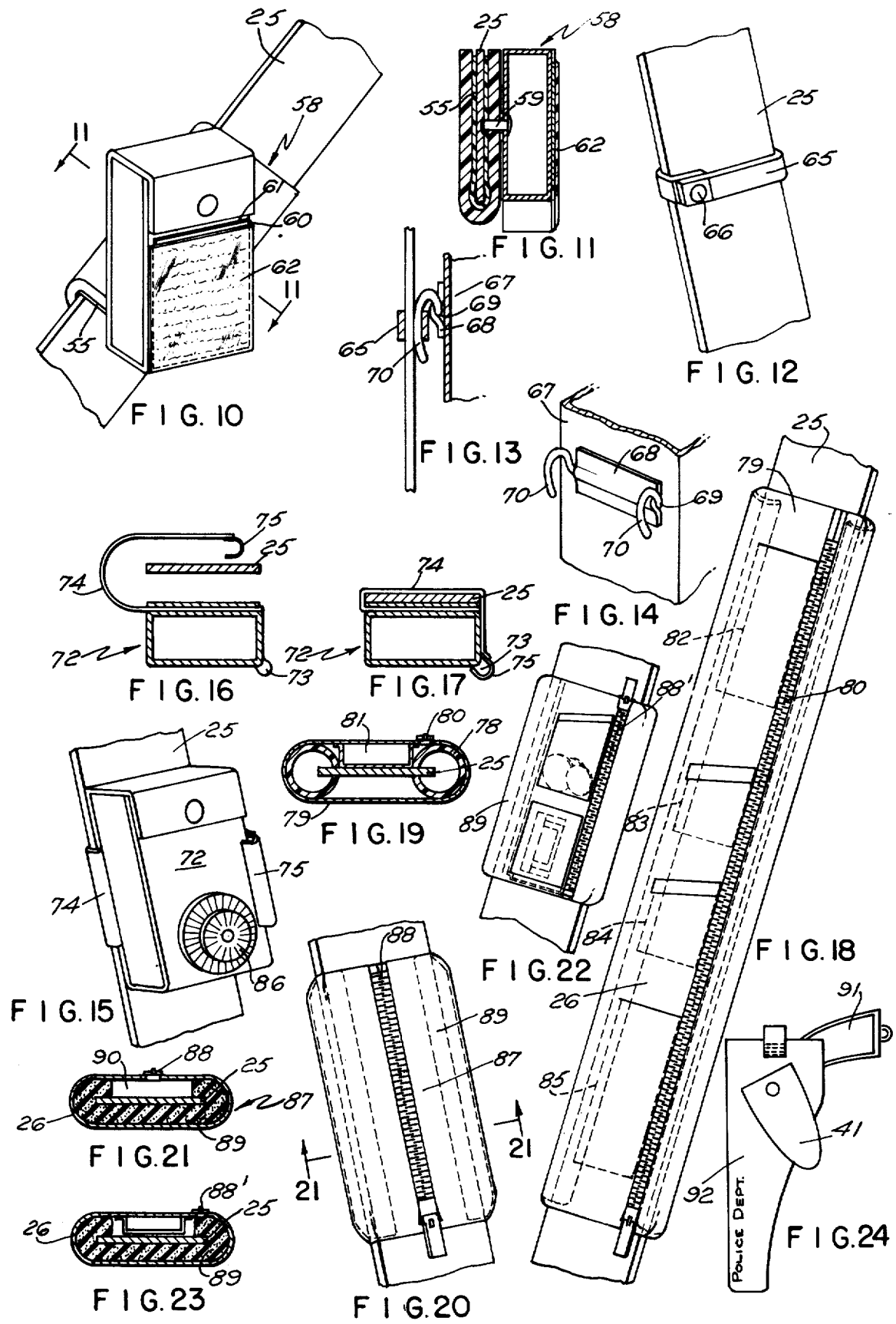

CONTAINER AND ITS MOUNTING ON A SAFETY HARNESS

BACKGROUND OF THE INVENTION

The National Highway Traffic Safety Administration has concluded that if the entire passenger car population were in compliance with the respective standards, an interlock belt system would annually save 7,000 lives and prevent 340,000 injuries. However, the interlock regulation has been revoked and interlocks will not be required on 1975 automobiles or thereafter. This leaves us concerned with a question about the 7,000 lives and the 340,000 injuries, and a more objective question: how can the driving population be motivated to wear their auto safety harnesses?

It appears that neither regulations nor public interest television safety programming have convinced the majority of American motorists that wearing seat belts and shoulder belts is important to their safety. Yet there is a reasonble probability that drivers could be motivated to wear their seat belts and shoulder belts if some additional, highly functional, device could be added to their shoulder belts as an easily attached accessory which would capture the interest of motorists and appeal to their sense of practicality. The shoulder belt, when it is worn by the driver is a most convenient location for attaching a container which would hold anything that the driver might want to have readily available such as bridge and turnpike tolls, credit cards and the like.

It is contemplated that the invention described in this application, namely, an attachable compartment for the holding of toll coins, bills, cards and a simple computer will provide the margin of interest in using the shoulder belt for the additional function of having these conveniences closely located and readily accessible to the driver. It is also hoped that by having these items readily accessible that it will not be necessary for the driver to disconnect his shoulder belt and/or seat belt to locate toll coins or bills.

There will be approximately one hundred million automobiles that are equipped with shoulder belts, registered in the United States by 1977. Hopefully, most of the drivers who might be killed or injured every year, through neglecting to wear their seat/shoulder belt systems, will voluntarily wear their shoulder belts because the convenience in wearing the shoulder belts equipped with the toll containers outweighs the inconvenience of putting the belts on.

Therefore, this invention is directed to increasing the use of shoulder belts through the margin of utility provided by this detachable toll container accessory for the great majority of drivers who will ride in shoulder belt equipped automobiles for the next decade.

One of the reasons shoulder belts are left disconnected is that many gentlemen drivers carry their toll change in containers that are not always easily reached such as their wallet pockets thus the belts must be disconnected in order to obtain toll money. Lady drivers often have to reach for a pocketbook that is just beyond their grasp because the pocketbook or change purse may have slid out of immediate reach in the normal course of driving and slowing down for toll stations. It is accordingly an objective of this invention to provide means for making toll change readily accessible without disconnecting the protective belts.

A study report was delivered in November 1974 by Man Factors, Inc. of San Diego, California, to the National Highway Traffic Safety Administration of the U.S. Department of Transportation titled *Sources and Remedies for Restraint System Discomfort and Inconveniences*. DOT HS-801 277. Page 132 of the study contained the following statements:

"1. The equipment worn by police officers while on duty presents a number of problems in the use of a standard 1974 seat-belt system. Weapons and badges become entangled in the belt during doffing, at times preventing the officer from making a rapid exit. Access to weapons is sometimes restricted while the system is being worn. And difficulties in donning can cause a critical delay in an emergency start. For the time being at least we do not believe law enforcement personnel should be required to wear seat belt, but should be allowed to use them as they see fit for a given situation. It is strongly recommended that a study be undertaken to determine the extent and nature of the restrictions in seat-belt usage imposed by police equipment with the objective of providing a basis for the development of an alternate system designed to accommodate the special police situation."

Thus, another objective of this invention is to provide on a shoulder strap a mounting for a holster for a police officer's service pistol.

SUMMARY OF THE INVENTION

One objective of this invention to provide a container for keeping tolls, tickets or passes, direction notes, lozenges, cigarettes and a simple computer immediately accessible (particularly to the unaccompanied driver) by including the container in an existing accessory that has already been provided for other purposes such as comfort and the reduction of cosmetic injury. Such an accessory as is described in U.S. Pat. No. 3,306,662 and in U.S. Pat. No. 3,457,282.

This invention is to provide a readily attachable container for the shoulder belt (or seat belt in cars not equipped with shoulder belts). This invention includes alternative designs for a toll coin compartment that is readily attachable to the shoulder belt by one of several methods. This convenient location of toll coins, currency and credit cards enables the driver to be prepared to pay the toll without being distracted from driving while approaching the toll station. Most importantly, it allows the driver to keep the shoulder harness on while accomplishing the successive payments of tolls at each toll booth encountered. All too frequently the shoulder harness and seat belt are not rebuckled if the driver forgets or becomes annoyed at the inconvenience of unbuckling and rebuckling his shoulder belt at each toll booth. This problem takes on a significant magnitude when the number of toll booths on the thousands of miles of toll roads in the U.S. is considered. The number of toll bridges and tunnels also contribute to the toll management problems of the driver.

No part of the mounting has any rigid or semi-rigid parts against the body and between the body and the body belt. In all examples of the container for the tolls it should be noted that the coin section of the container is located so that the various sizes of coins will be readily identifiable and extractable because of the shallow depth of the coin section. Currency will also be easily accessible to the driver because of the configuration of the bill compartment.

A swivel arrangement also allows vertical positioning of the toll container on the diagonally arranged shoulder belt of the driver.

DESCRIPTION OF THE DRAWINGS

FIG. 1 is a perspective view showing the container of this invention as mounted upon the protecting device for a shoulder strap as shown in my U.S. Pat. No. 3,957,282;

FIG. 2 is a perspective view illustrating a portion of the showing of FIG. 1 and with the container as removed and turned over showing its underside and the mounting means for the container on the shoulder strap protecting device;

FIG. 3 is a perspective view on an enlarged scale of one of the parts mounted on the belt which recieves the blade mounted on the container;

FIG. 4 is a perspective view of two blades such as shown in FIG. 2 but looking at the other side thereof;

FIG. 5 is a sectional view illustrating the container and the pockets therein and also showing the rivet for swivelly mounting the member shown in FIG. 4;

FIG. 6 is a perspective view of a modified form of blade for mounting on the container;

FIG. 7 is a sectional view illustrating a modified form of mounting the blade member by cementing the blade 44 to container 45;

FIG. 8 is a view similar to FIG. 7 but showing the blade as riveted on the container rather than cemented thereto as shown in FIG. 7;

FIG. 9 is a perspective view of a modified form showing a clip for application to the side of the belt and resiliently held thereon;

FIG. 10 is a perspective view showing the mounting means of FIG. 9 with the container attached thereto and in a vertically aligned position;

FIG. 11 is a sectional view on line 11—11 of FIG. 10;

FIG. 12 is a perspective view showing an elastic band as embracing the seat belt or shoulder belt;

FIG. 13 is a fragmental view showing in section the band of FIG. 12 and a portion of a container with a mounting means to engage the band of FIG. 12;

FIG. 14 is a perspective view of a fragmental portion of the container with the mounting means as attached to the back thereof;

FIG. 15 is a perspective view of a still different means of mounting the container on the body belt;

FIG. 16 is a sectional view with the container of FIG. 15, its mounting and the strap separated;

FIG. 17 is a similar sectional view but showing the mounting means as in secure position about the belt as shown in FIG. 15;

FIG. 18 is a perspective view showing a variation of the protecting device such as shown in FIG. 1 on the shoulder belt and showing a plurality of containers as mounted thereon and also showing a modified form of protecting device such as illustrated in my co-pending application Ser. No. 529,710;

FIG. 19 is a sectional view of the modified form of protecting device shown in FIG. 18 about the shoulder belt;

FIG. 20 is a perspective view of a short form of protecting device about the body belt;

FIG. 21 is a sectional view of FIG. 20 on line 21—21;

FIG. 22 is a perspective view showing a container as mounted on the short form of protecting device;

FIG. 23 is a sectional view of the showing of FIG. 22;

FIG. 24 is an elevation of pistol and holster with a means of FIG. 6 for mounting the same.

DESCRIPTION OF THE PREFERRED EMBODIMENT

With reference to the drawings 25 designates the body belt and in FIG. 1 is shown of the shoulder belt type with a cushion protecting device 26 about the belt as shown in my U.S. Pat. No. 3,957,282 and is secured in place by a zipper connection 27 located on the front side and at one side of the center of the encircling member 26. Secured to the front side of this member 26 there are a pair of pocket members shown generally in FIG. 3 at 30 which are arched to provide a space such as 31 with flanges 32 on either side thereof to be sewn or otherwise secured to the front surface of the cushioning member 26.

A container designated generally 33 has on the back surface 34 thereof a blade member 35 shown in perspective in FIG. 4 with a pair of arms 36 to extend into the pockets 31 to secure it to the cushioning member 26. A bar 37 extends between the two arms 36 and is provided with an opening 38 to receive a rivet 39 pivotally mounting the member on the container 33. This enables the container to be swung so as to be vertical when the strap over the shoulder of the body is at an angle to the vertical. In order to limit the swing or pivoting of the member 35 with relation to the container 33, a bar 40 may be secured to the back of the container so that the bar 37 will hit this member 35 and limit its swinging movement.

In some cases instead of having two blades such as 36 a single blade 41, as shown in FIG. 6, may be provided and a pocket to receive this will be correspondingly shaped on the front wall of the cushioning device 26. It may also be pivotally mounted by reason of the opening 42 in the turnback portion 43 of the blade. In some cases instead of having a blade pivotally mounted it may pass through an opening 44 in the container and be secured on the inner surface of the container by cement or it may be riveted on the inner surface of the container as by rivets 46 as shown in FIG. 8.

The container as shown in section in FIG. 5 has a small compartment 47 to receive coins 48 and also a deep compartment 49 for the reception of folded money or credit cards 50 as shown in FIG. 5. A division wall 51 may be added to divide the two compartments and a cover 52 extends across both compartments to keep the same closed and may have a snap fastener 53 for this purpose as shown in FIG. 1.

In FIG. 9 I have illustrated a different mounting of cushioning device and which contains resilient U-shaped metal or plastic part 55, the arms of which must be spread to receive the belt 25 and will grip the belt to hold it in place and which is covered with cushioning material 56. This may be applied over the edge of a shoulder strap 25 as shown in FIG. 10. An opening 57 provides a means for pivotally mounting the container 58 on this device as shown in FIG. 11. The pivotal mounting is shown by rivet 59 which allows the container to be angled with reference to the strap 26 as shown in FIG. 10. On the front of this container 58 there is a transparent pocket 60 which contains a card 61 with printed matter 62 thereon for instructions as may be desired and which will be visible through the transparent pocket 60. The container with its blade as shown in FIGS. 5, 7 or 8 may be mounted in opening 90 of FIG. 21 or pocket 82 or 85 of FIG. 18 which holds it in place against the front face of the belt.

In some cases a different mounting may also be provided and as shown in FIG. 12 the belt 25 has a band 65 extending about it and which will be of an elastic nature secured by a snap fastener 66 to snugly embrace the belt 25. In this case a container 67 as shown in FIG. 14 and FIG. 15 will have a deflected plate 68 on the back thereof through which a wire 69 extends which is provided at either end thereof with hooks 70 to extend through the strap as shown in FIG. 13, thus making this easily attachable or detachable from the band 65 which extends snugly about the belt 25 so that it will not slip thereon.

In FIGS. 16 and 17 the container designated generally 72 is provided with a vertically extending bale 73 and a wide elastic strap 74 secured to the container may be passed about the belt 25 and is provided with a hook 75 to engage this bale 73 as shown in FIG. 15 so as to secure it on the belt 25.

In FIG. 19 an alternate form of cushioning member is shown having resilient split cylindrical portions 78 on either edge of the belt 25 with a brace between and with an encircling fabric part 79 which is secured in place by zipper 80. A pocket is formed at 81 for dollar bills. This form is shown in FIG. 18 with a pluraltiy of pockets 82, 83, 84 and 85 mounted as by sewing on the fabric 79 along the extent of the embracing cushioning member just described which form of cushion is also shown in my U.S. Pat. No. 3,957,282. FIG. 23 shows the container compartments of FIG. 19. However, the resilient tubing is replaced by the foam 89 as in FIG. 21 and another embodiment of my U.S. Pat. No. 3,957,282. Concerning the pockets in either FIG. 18 or 22, pocket 82 might be used for credit cards or notes, pocket 83 for coins, pocket 84 for a circular computer, and pocket 85 for paper currency. The computer device 86 may also be removably detachable or permanently mounted on the container as shown in FIG. 15.

In some cases the cushioning device may be of shorter extent than that shown in FIGS. 1 and 18 and here is shown in FIG. 20 at 87 with a zipper 88 centrally located thereof while the zipper in FIG. 22 is at one side as at 88'. In this case the cushioning material 89 extends about the belt 25 as shown in FIG. 21 around the edges thereof leaving a pocket 90 for the reception of mounting means for a container such as 33 with the legs of FIG. 4 or 6 on the front side thereof. With the zipper closure offset as in FIG. 23 and the internal design of FIG. 19 with pocket 81 another version is disclosed.

In FIG. 24 a pistol 91 in a holster 92 is shown with a blade 41 pivotally mounted therein which blade may be inserted in pocket 85 of FIG. 18 or in 90 of FIG. 21 on the belt for quicker access and convenience of a police officer. Holster 92 may also be pivotally attached at hole 57 of FIG. 9. The locating of the holsters on the shoulder belts allow the police officers to have their service pistols readily accessible while riding in the police vehicle and immediately available during egress from the vehicle.

It will be noted that in all of the various forms of mounting the body belt is not in any way encumbered in between the back surface thereof and the body of the wearer by any material which is of a stiff nature without some cushioning means between it and the body of the person wearing the belt.

It will also be noted that no permanent modifications to any of the seat belts or shoulder belts are required in order to attach any variation of the toll container. The original automobile safety harness equipment prescribed by the National Highway Traffic Safety Administration for all new automobiles from 1967 on is used as a mounting for the devices claimed in this application.

I claim:

1. In combination with a safety shoulder belt for the occupant of an automobile, a covering member embracing the belt adjacent the portion of the belt extending over the shoulder of the user and having an outer frontal surface away from the user, said member having resilient material embracing the belt to cushion pressure of the shoulder belt against the neck and shoulder of the user of the belt, means to detachably mount said covering member on said shoulder belt, an article container having clip means and means on the outer surface of said covering member to removably receive said clip means and mount the container on the outer frontal surface of the covering member.

2. The combination of claim 1 wherein the clip means is pivotally mounted on said container.

3. The combination of claim 1 wherein the clip means comprises a blade-like part carried by said container and a pocket on said member to receive said blade.

4. The combination of claim 1 wherein the clip means mounting the container comprises a blade extending between the member and front side of the belt.

5. The combination of claim 1 wherein the container has two compartments and a cover for the compartments.

6. The combination of claim 1 wherein said member has a longitudinal extending opening along the front side of the belt and receiving a part of the mounting means therein.

7. The combination of claim 1 wherein said member has means to receive a plurality of containers mounted on the front side thereof.

8. The combination of claim 1 wherein the container has means to divide the interior thereof into a plurality of compartments.

* * * * *